J. J. SINGLEY.
POTATO DIGGER.
No. 96,153. Patented Oct. 26, 1869.
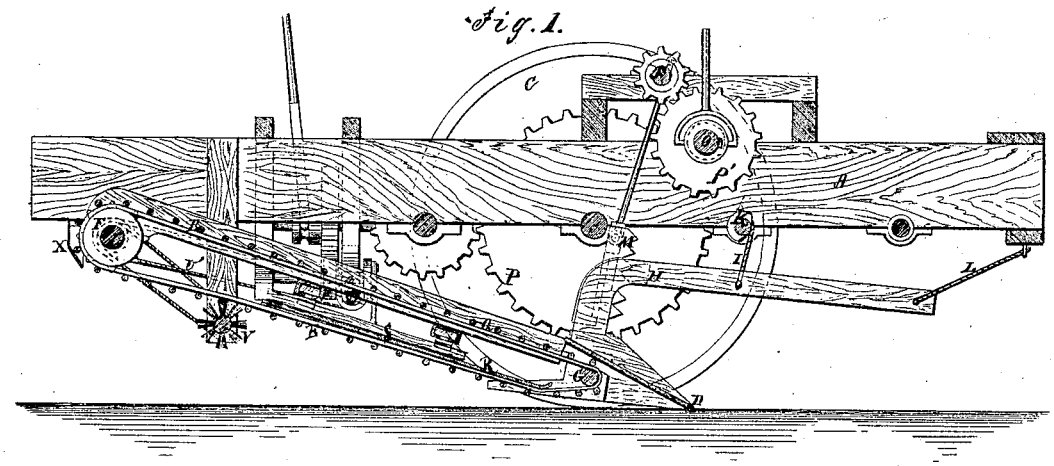
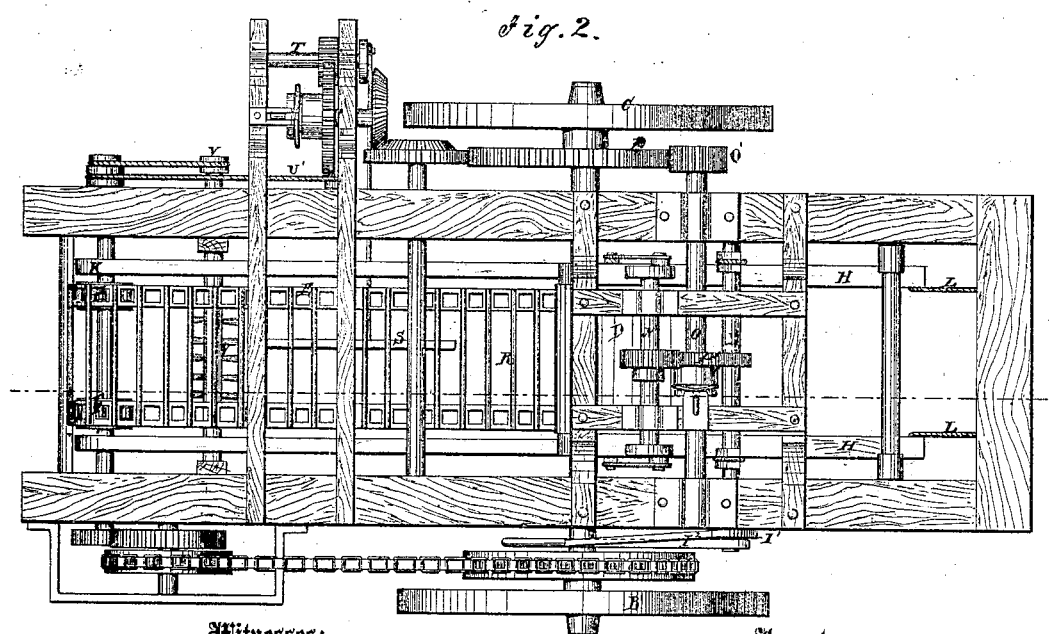

United States Patent Office.

JOSEPH J. SINGLEY, OF LAFAYETTE, INDIANA.

Letters Patent No. 96,153, dated October 26, 1869.

IMPROVEMENT IN POTATO-DIGGERS.

The Schedule referred to in these Letters Patent and making part of the same.

*To all whom it may concern:*

Be it known that I, JOSEPH J. SINGLEY, of Lafayette, in the county of Tippecanoe, and State of Indiana, have invented a new and improved Potato-Digger; and I do hereby declare that the following is a full, clear, and exact description thereof, which will enable others skilled in the art to make and use the same, reference being had to the accompanying drawings, forming part of this specification.

The object of this invention is to provide an improved horse or animal-power potato-digging and screening apparatus.

The invention consists in the application to a scraping-plow, and endless screening-device arranged in connection therewith on a frame borne upon two wheels, of certain vine-cutting devices, to prevent as much as possible the gathering of the vines on the screen and clogging the same or the plow; also, an earth-discharging apparatus, and a screen-shaking and brushing-apparatus, all as hereinafter more fully specified.

Figure 1 represents a longitudinal sectional elevation of my improved machine, taken on the line $x\ x$ of fig. 2, and Figure 2 represents a plan view of the same.

Similar letters of reference indicate corresponding parts.

A represents the frame, suspended on a pair of wheels, B C, and having suspended from it a scraper or shovel, D, and an endless carrier-screen, E, which works over the pulleys F at one end, and the shaft G at the other, in rear of the shovel, and supported by the supporting-beams thereof.

The plow or scraper is connected rigidly to a pair of beams, H, suspended by cords I from a shaft, K, for winding the cords up or letting them out to gauge the depth of the working of the plow, or to raise it out of the ground altogether when required.

This shaft has a ratchet-wheel, I¹, at one end, and a lever and spring-pawl, I², for operating it.

The front end of the beams are also connected, by cords L, to the frame, by which they are drawn.

The plow consists of a plane plate, supported obliquely to the ground in the said beams, so as to be drawn into it as the machine moves along.

These beams rise nearly vertically from the point where the plow is connected, and the vines and weeds naturally gather here and clog the plow. To prevent this, I have provided a pair of vertically-reciprocating cutters, M, one to each beam, working in vertical grooves or ways provided for them on the beams, and operated by a crank-shaft, N, to which they are suitably connected.

The said crank-shaft is operated by a counter shaft, O, deriving motion, by means of a pinion, O', suitably gearing with a large spur-wheel, P, connected to the wheel C.

The wheel P', on the counter-shaft O, which drives the crank-shaft N, is made to slip for stopping the motion of the cutters when they are not required.

The earth scraped up, together with the potatoes, passes with them upon the upper part of the screen, at Q, and, falling through it, would naturally clog the returning part below, and thereby prevent the exercise of the full measure of usefulness of the said screen.

I have therefore introduced a plate or table, R, between the upper and lower parts of the screen, for the reception of the earth, and a laterally-moving discharger, S, which throws the earth falling through the upper part off at either side.

This discharger is worked by a crank-shaft, T, suitably arranged at one side of the machine, and driven by the large wheel P, by a train of gearing, suitably interposed between them and arranged for shifting the gear when required for throwing it out of action.

U represents a revolving shaft, having enlargements or projections thereon, whereby it is adapted to operate as a knocker or shaker, and placed under the screen for shaking, and also for supporting it.

It is operated by a belt, U', from the shaft which works the screen. The potatoes are delivered over the rear of the carrier.

V represents a rotary brush placed under the screen, and also operated by a belt from the same shaft.

This brush is designed to clean the screen as it returns to the plow, under the plate R, and acts upon the said screen, at a point between which and the plow no earth falls upon it.

X represents a fixed cutter, placed near the carrier-screen, which it turns over the pulleys F, to separate any vines projecting from potatoes which may work through the spaces between the rods of the screen.

Having thus described my invention,

I claim as new, and desire to secure by Letters Patent—

1. The combination, with the plow and plow-beams, of the reciprocating cutters M, substantially as specified.

2. The combination, with the carrier-screen, of the earth-receiving plate R and discharger S, substantially as specified.

3. The arrangement of the plow-beam H, cords I, adjusting-shaft K, and cords L together, and with the frame, substantially as specified.

4. The combination, with the carrier-screen, of the revolving brush V, when arranged substantially as specified.

5. The combination, with the carrier-screen, of the fixed cutter X, substantially as specified.

JOSEPH J. SINGLEY.

Witnesses:
I. O. BRACKENBROUGH,
JOHN D. GOUGAR.